United States Patent
Danthalapelli et al.

(10) Patent No.: US 11,157,271 B2
(45) Date of Patent: Oct. 26, 2021

(54) DOCUMENTATION GENERATION FROM TEST AUTOMATE

(71) Applicant: SAP SE, Walldorf (DE)

(72) Inventors: Sai Phani Sharath Chandra Danthalapelli, Warangal (IN); Warren Mark Fernandes, Mumbai (IN)

(73) Assignee: SAP SE, Walldorf (DE)

( * ) Notice: Subject to any disclaimer, the term of this patent is extended or adjusted under 35 U.S.C. 154(b) by 33 days.

(21) Appl. No.: 16/701,498

(22) Filed: Dec. 3, 2019

(65) Prior Publication Data
US 2021/0165652 A1 Jun. 3, 2021

(51) Int. Cl.
*G06F 8/73* (2018.01)
*G06F 9/451* (2018.01)

(52) U.S. Cl.
CPC ............... *G06F 8/73* (2013.01); *G06F 9/454* (2018.02)

(58) Field of Classification Search
CPC .................................. G06F 8/73; G06F 9/454
See application file for complete search history.

(56) References Cited

U.S. PATENT DOCUMENTS

| | | | |
|---|---|---|---|
| 6,330,692 B1 * | 12/2001 | Kamuro | G06F 11/3676 712/236 |
| 7,404,123 B1 * | 7/2008 | Ku | G05B 19/042 714/25 |
| 8,326,889 B2 | 12/2012 | Kaesermayr | |
| 9,069,646 B2 * | 6/2015 | Rothley | G06F 8/73 |
| 9,575,751 B2 | 2/2017 | Balat et al. | |
| 9,880,982 B2 * | 1/2018 | Virk | G06Q 30/02 |
| 9,954,746 B2 | 4/2018 | Kashtan et al. | |
| 2002/0174414 A1 * | 11/2002 | Matsuo | G06F 11/3684 717/126 |

(Continued)

FOREIGN PATENT DOCUMENTS

EP 0694835 A1 * 1/1996 ............... G06F 8/73

OTHER PUBLICATIONS

Thummalapenta et al., "Automating Test Automation", 2012, IEEE (Year: 2012).*

(Continued)

*Primary Examiner* — Wei Y Zhen
*Assistant Examiner* — Junchun Wu
(74) *Attorney, Agent, or Firm* — Schwegman Lundberg & Woessner, P.A.

(57) ABSTRACT

Systems and methods are provided for receiving a request for documentation related to functionality of an application, accessing a test automate generated from a recording of actions using the functionality of the application, and parsing the test automate to determine one or more steps in a process and, for each step in the process, a list of the actions for the step and corresponding data. The system and methods further provide for generating a file comprising the one or more steps and the list of actions and corresponding data for each step, determining a selected template for generating documentation for the functionality of the application and generating a populated template by populating one or more steps and corresponding list of actions in the selected template using the file comprising the one or more steps and the list of actions and corresponding data for each step.

20 Claims, 13 Drawing Sheets

(56) References Cited

U.S. PATENT DOCUMENTS

| | | | |
|---|---|---|---|
| 2003/0051157 A1* | 3/2003 | Nguyen | H04L 63/04 726/4 |
| 2003/0200348 A1* | 10/2003 | Humphries | G06F 8/73 719/310 |
| 2005/0125780 A1* | 6/2005 | Rose | G06F 9/454 717/140 |
| 2006/0156278 A1* | 7/2006 | Reager | G06F 9/454 717/104 |
| 2006/0195817 A1* | 8/2006 | Moon | G06F 11/368 717/104 |
| 2007/0061719 A1* | 3/2007 | Law | G06Q 10/107 715/700 |
| 2009/0282333 A1* | 11/2009 | Olsen | G06F 40/186 715/703 |
| 2010/0293480 A1* | 11/2010 | Shivananda | G06F 8/73 715/760 |
| 2012/0102458 A1 | 4/2012 | Meijer et al. | |
| 2013/0198038 A1* | 8/2013 | Mowatt | G06Q 10/10 705/26.41 |
| 2016/0012145 A1* | 1/2016 | Benjamin | G06F 16/986 715/234 |
| 2016/0378464 A1* | 12/2016 | Balat | G06F 8/74 717/123 |
| 2016/0379299 A1* | 12/2016 | Alizadeh | G06Q 50/163 705/80 |
| 2018/0067836 A1 | 3/2018 | Apkon et al. | |
| 2018/0349556 A1* | 12/2018 | Owen | G06F 40/186 |
| 2019/0079853 A1* | 3/2019 | Makkar | G06F 8/71 |
| 2020/0097920 A1* | 3/2020 | Doctor | G06Q 10/063114 |

OTHER PUBLICATIONS

Manica et al. "R-Extractor: a method for data extraction from template-based entity-pages", 2017, IEEE (Year: 2017).*

Neto et al., "TAL Processor for Hypermedia Applications", 2012, ACM (Year: 2012).*

Cui et al., "The Research of PHP Development Framework Based on MVC Pattern", 2009, IEEE (Year: 2009).*

"Automated Business Process Documentation for Testing with Worksoft Analyze", Worksoft, Inc., (2015), 1 pg.

"RPA Process Documentation", Epiance Software, (2019), 1 pg.

Doust, Judy, "Business Process Documentation", Original Software, (2019), 1 pg.

* cited by examiner

```
<?xml version="1.0" encoding="utf-16"?><asx:abap
xmlns:asx="http://www.sap.com/abapxml"
version="1.0"><asx:values><DATA><PR_ITEMS><item><PROCESSTEST_ID/><PROCESS_ID/><SEQNO
>00001</SEQNO><MANDT>360</MANDT><STEP_ID/><STEP_NAME>Create Sales
Order</STEP_NAME><VERSION>0000</VERSION><COUNTRY>XX</COUNTRY><STEP_DESC>Create Sales
Order</STEP_DESC><UI_TECHNOLOGY/><SOFTWARE_COMP/><REL>116</REL><APPLICATION/><PKG/><
TAGNAME>SalesOrder-create</TAGNAME><URL_PARAMS/><STEP_XML><?xml version="1.0"
encoding="utf-8"?><asx:abap xmlns:asx="http://www.sap.com/abapxml"
version="1.0"><asx:values><DATA SEMANTIC_OBJECT="SalesOrder-create"
COMPLETE_URL="" UITECH="06" RECTIME="06" ARTIFACT_ID="" ><ACTION TYPE="FIELDS"
STATUS="" PERF="" OPTIONAL_STEP="" FORMULA="" UICHECK="" UITECH=""><FIELD
STATUS=""><NAME/><VALUE/><TYPE>AppTag</TYPE><LABEL>
SalesOrder-create</LABEL><CHANGEABLE/><FORMULA_ID/><ID/><
IMPORT>941882831C7D1ED994BA6DC6ACDEEF7F</IMPORT><EXPORT/><INDEX/&g
t;<CHECK/><CHECK_PARAM/><NODE_KEY/><OBJECT_REPOSITORY/><S
ERVICE/><ENTITYSET/><PROPERTY1/><PROPERTY2/><PROPERTY3/>&
lt;FILTER1/><FILTER2/><TECH_OBJECT/><JSON_OBJREPOSITORY/><F
IELD></ACTION><ACTION TYPE="FIELDS" STATUS="" PERF="" OPTIONAL_STEP=""
FORMULA="" UICHECK="" UITECH="06"><FIELD
STATUS=""><NAME>M0:46...:2:22##application-SalesOrder-create</NAME><
;VALUE>OR</VALUE><TYPE>ComboBoxSearch</TYPE><LABEL>Sales
Document
```

;<PROPERTY1/><PROPERTY2/><PROPERTY3/><FILTER1/><FILTER2/><TECH_OBJECT/><JSON_OBJREPOSITORY/></REPOSITORY/></FIELD></ACTION><ACTION TYPE="FIELDS" STATUS="" PERF="" OPTIONAL_STEP="" FORMULA="" UICHECK="" UITECH="06"><FIELD STATUS=""><NAME>M0:46:::5:22##application-SalesOrder-create</NAME><VALUE>1010</VALUE><TYPE>ComboBoxSearch</TYPE><LABEL>Sales Organization</LABEL><CHANGEABLE/><FORMULA_ID><ID>M0:46:::5:228</ID><IMPORT>9418B2831C7D1ED994BA6DC6ACDF2F7F</IMPORT><EXPORT/><INDEX/><CHECK/><CHECK_PARAM/><NODE_KEY/><OBJECT_REPOSITORY/>ClassName: IsField__input;TagName: INPUT;MouseEvent: LeftClick;FrameHierarchy: frame0-id:application-SalesOrder-create;Isdata: wnd[0]/usr/ctxtVBAK-VKORG</OBJECT_REPOSITORY><SERVICE/><ENTITYSET/><PROPERTY1/><PROPERTY2/><PROPERTY3/><FILTER1/><FILTER2/><JSON_OBJREPOSITORY/></REPOSITORY/></FIELD></ACTION><TECH_OBJECT/><ACTION TYPE="CLICK" STATUS="" PERF="" OPTIONAL_STEP="" FORMULA="" UICHECK="06"></CLICK CLICK_CATEGORY="" PROGRAM_NAME="" SCREEN_NUMBER=""><TYPE>Button</TYPE><NAME>##application-SalesOrder-create</NAME><LABEL>Sales Organization Distribution Channel Division Sales Office Sales Group</LABEL><NODE_KEY/><NODE_ACTION/><COLUMN_NAME/><ID/><OBJECT_REPOSITORY/>ClassName: urBorderBox;TagName: DIV;MouseEvent:

704 — Delivery</STEP_NAME><VERSION>0000</VERSION><COUNTRY>XX</COUNTRY><STEP_DESC>Outbound Delivery</STEP_DESC><UI_TECHNOLOGY/><SOFTWARE_COMP/><REL>116</REL><APPLICATION/><PKG /><TAGNAME>OutboundDelivery-createFromDueList</TAGNAME><URL_PARAMS/><STEP_XML><?x ml version="1.0" encoding="utf-8"?><asx:aba 706 xmlns:asx="http://www.sap.com/abapxml" version="1.0"><asx:values><DATA SEMANTIC_OBJECT="OutboundDelivery-createFromDueList" COMPLETE_URL="" UITECH="04" RECTIME="ms" ARTIFACT_ID=""><ACTION TYPE="FIELDS" STATUS="" PERF="" OPTIONAL_STEP="" FORMULA="" UICHECK="" UITECH=""><FIELD STATUS=""><NAME/><VALUE/><TYPE><AppTag><LABEL> OutboundDelivery-createFromDueList</LABEL><CHANGEABLE/><FORMULA_ID/&g t;<ID/><IMPORT>1C98EC1818551EE994BA76F5E300DD9A</IMPORT><EXPORT /><INDEX/><CHECK/><CHECK_PARAM/><NODE_KEY/><OBJECT_REP OSITORY/><SERVICE/><ENTITYSET/><FILTER1/><PROPERTY1/><PROPERTY2/>&l t;PROPERTY3/><FILTER2/><ACTION><FILTER2/><TECH_OBJECT/><JSON_OBJREPO SITORY/></FIELD></ACTION><ACTION TYPE="FIELDS" STATUS="" PERF="" OPTIONAL_STEP="" FORMULA="" UICHECK="" UITECH="04"><FIELD STATUS=""><NAME><i2d.le.st.delivery.create::sap.suite.ui.generic.template.Li stReport.view.ListReport::C_OutboundDeliveryCreate--listReportFilter-filterItemContr ol_BASIC-SDDocument-inner</NAME><VALUE>27</VALUE><TYPE>InputField</ TYPE><LABEL>Sales

802 — Create Sales Orders — 808 — 810 — 812

| Step | Actions | Expected Results | Comments |
|---|---|---|---|
| 1 | Navigate to the Create Sales Orders app | App home screen is displayed | You can add warnings here! Warning content |
| 2 | Enter value OR in Sales Document Type field | The value OR was entered | You can add warnings here! Warning content |
| 3 | Enter 1010 in Sales Organization field | The value 1010 was entered | You can add warnings here! Warning content |
| 4 | Click the Sales Organization Distribution Channel Division Sales Office Sales Group button | Sales Organization Distribution Channel Division Sales Office Sales Group button is clicked. Please save required values. | You can add warnings here! Warning content |
| 5 | Enter 10 in Distribution Channel field | The value 10 was entered | You can add warnings here! Warning content |
| 6 | Cllick the Sales Organization Distribution Channel Division Sales Office Sales Group button | Sales Organization Distribution Channel Division Sales Office Sales Group button is clicked. Please save required values. | You can add warnings here! Warning content |
| 7 | Cllick the Sales Organization Distribution Channel Division Sales Office Sales Group button | Sales Organization Distribution Channel Division Sales Office Sales Group button is clicked. Please save required values. | You can add warnings here! Warning content |

806 → Step; 804 → {rows 1–7}

902 — Outbound Delivery  908  910  912

| Step | Actions | Expected Results | Comments |
|---|---|---|---|
| 1 | Navigate to the New Standard Process Step app | App home screen is displayed | You can add warnings here! Warning content |
| 2 | Enter 270 in Sales Document field | The value 270 was entered | You can add warnings here! Warning content |
| 3 | Click the Go button | Go button is clicked. Please save required values. | You can add warnings here! Warning content |
| 4 | Select the checkbox in Column 2 | Check box in column 2 is checked with an X | You can add warnings here! Warning content |
| 5 | Click the Create Deliveries (1) button | Create Deliveries (1) button is clicked. Please save required values. | You can add warnings here! Warning content |
| 6 | Click the Display Log button | Display Log button is clicked. Please save required values. | You can add warnings here! Warning content |

906 → Step column; 904 → rows bracket

Create Sales Orders — 1002

The Customer Project Management scope item realizes the key steps of the end-to-end process for Project Services. It integrates sales orders with project management, allowing you to create customer invoices for time and expenses - including external services - recorded against a customer project. Invoices can be created on a time and materials basis, a fixed-price basis, or a combination of both or as periodic services. You can also derive contract values and show whether the contract margin is on plan. After the customer invoice s issued, customer payments can be monitored. During period-end closing activities, accounting and financial close activities can be performed. This scope item also supports the analysis of project profitability based on project costs and revenues. This document provides a detailed procedure for testing the scope item after solution deployment, reflecting the predefined scope of the solution. Each process step is covered in its own section, providing the system interactions (that is, test steps) in a table view. Steps that are not in scope of the process but are needed for testing are marked accordingly (see the Test Step column). Customer-project-specific steps can be added.

1004 — Overview

| Section | Credentials | Comments |
|---|---|---|
| Create Sales Order | -- | --> |
| Outbound Delivery | -- | --> |

1006

1016 — Roles and Support — 1008      1010    1012

| App | User | Role |
|---|---|---|
| Create Sales Order ▼ | Retail Store Manager ▼ | *$SAP BR RETAIL ▼ STORE ASSOCIATE |
| Create Outbound Deliveries- From Sales Orders ▼ | Shipping Specialist ▼ | SAP BR SHIPPING ▼ SPECIALIST |

1014 — Test Procedures

802 — Create Sales Orders

| Step | Actions | Expected Results | Comments |
|---|---|---|---|
| 1 | Navigate to the Create Sales Orders app | App home screen displayed | You can add warnings here! Warning content |

*FIG. 10*

|    | A | B | C | D | E | F | G | H | I | J | K |
|----|---|---|---|---|---|---|---|---|---|---|---|
| 1  | DE | GB | FR | CN | BR | JP | RU | US | IN | SE | HU |
| 2  | 1010 | 1110 | 1210 | 1310 | 1410 | 1510 | 1610 | 1710 | 1810 | 1910 | 2110 |
| 3  | EUR | GBP | EUR | CNY | BRL | JPY | RUB | USD | INR | SEK | HUF |
| 4  | V0 | X0 | V0 | J0 | C0 | V0 | V0 | I0 | G0 | V0 | V0 |
| 5  | A0 | Y0 | A0 | X0 | S0 | A0 | A0 | O0 | F0 | A0 | S0 |
| 6  | 10100001 | 11100001 | 12100001 | 13100001 | 14100001 | 15100001 | 16100001 | 17100001 | 18100001 | 19100001 | 21100001 |
| 7  | 10100002 | 11100002 | 12100002 | 13100002 | 14100002 | 15100002 | 16100002 | 17100002 | 18100002 | 19100002 | 21100002 |
| 8  | 10100003 | 11100003 | 12100003 | 13100003 | 14100003 | 15100003 | 16100003 | 17100003 | 18100003 | 19100003 | 21100003 |
| 9  | 10100004 | 11100004 | 12100004 | 13100004 | 14100004 | 15100004 | 16100004 | 17100004 | 18100004 | 19100004 | 21100004 |
| 10 | 10100005 | 11100005 | 12100005 | 13100005 | 14100005 | 15100005 | 16100005 | 17100005 | 18100005 | 19100005 | 21100005 |
| 11 | 10300001 | 11300001 | 12300001 | 13300001 | 14300001 | 15300001 | 16300001 | 17300001 | 18300001 | 19300001 | 21300001 |
| 12 | 101A | 111A | 121A | 131A | 141A | 151A | 161A | 171A | 181A | 191A | 211A |
| 13 | 101B | 111B | 121B | 131B | 141B | 151B | 161B | 171B | 181B | 191B | 211B |
| 14 | 101C | 111C | 121C | 131C | 141C | 151C | 161C | 171C | 181C | 191C | 211C |
| 15 | 101R | 111R | 121R | 131R | 141R | 151R | 161R | 171R | 181R | 191R | 211R |
| 16 | 61400000 |   |   |   |   |   |   |   |   |   |   |

DOCUMENTATION GENERATION FROM TEST AUTOMATE

BACKGROUND

For any organization that develops software applications or other products or services, documentation is needed each time a new application is released or new functionality for a new application is released by the organization. Most organizations have entire teams dedicated full-time to work on documenting processes. Conventional documenting processes, however, result in many inconsistencies and inefficiencies.

BRIEF DESCRIPTION OF THE DRAWINGS

Various ones of the appended drawings merely illustrate example embodiments of the present disclosure and should not be considered as limiting its scope.

FIGS. 5-7 illustrate example portions of a test automate, according to some example embodiments.

FIGS. 8-10 illustrate example portions of a populated template, according to some example embodiments.

FIG. 11 illustrates example country-specific data for localization, according to some example embodiments.

DETAILED DESCRIPTION

Figure 1:
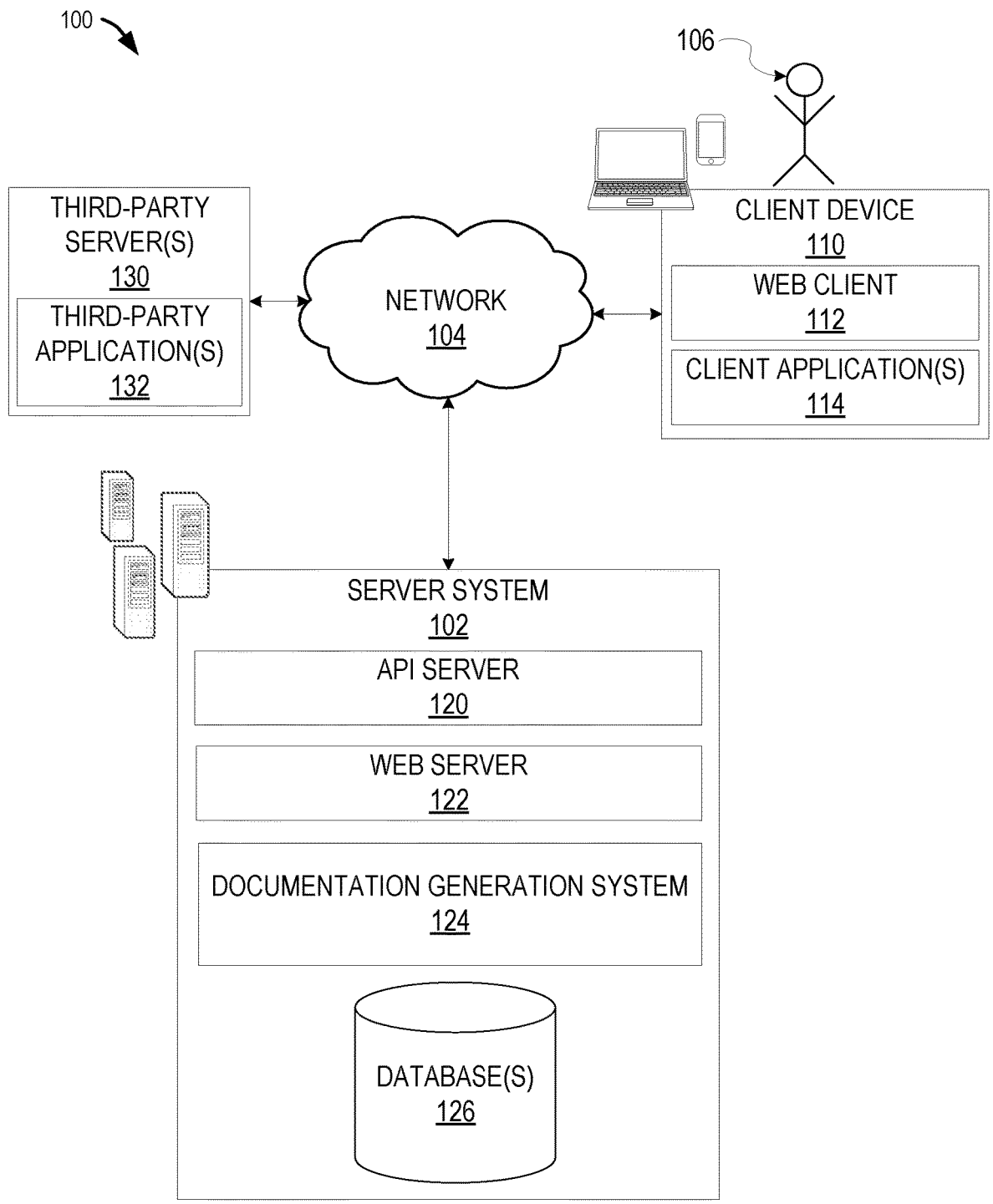
FIG. 1 is a block diagram illustrating a networked system, according to some example embodiments.

Systems and methods described herein relate to document generation from a test automate. As explained above, conventional documenting processes result in many inconsistencies and inefficiencies. For example, a typical documentation process may comprise a business analyst determining a new business process (e.g., new functionality) that should be implemented in a software application. The business analyst may document an outline for the new business processes. A product owner (e.g., a person responsible for new functionality to be implemented in a software application) then defines product specifications and an application flow for the given business flow. Next, a specialized team of people manually create detailed documents describing a test flow for the new functionality.

Another team of professionals (e.g., test engineers) then performs the test flow for the new functionality and verifies the results obtained. The test engineers then create a test automate for the new functionality based on the detailed documents describing the test flow for the new functionality. In one example, to create the test automate, actions for an application are recorded into a document (e.g., XML or another format). For example, actions that would be performed by a user to complete a sales order in a sales order application are recorded and stored in a document (e.g., the actions of the test engineer when using the new functionality in the software application are recorded). For example, a testing tool (e.g., Tricentis' Tosca, HP's UFT, or other testing tool) is used to generate a test automate (e.g., an automated version of the recorded actions in the document). Accordingly, a test automate comprises each of the recorded actions and responses of the application as commands in a script. The test automate may also include data corresponding to each action, such as a label for each action and a value for each action. An example of portions of a test automate is shown in FIGS. 5-7 and described below.

The various documentation and the test automate are then provided to a customer, who will be adding the functionality for its end users.

If, however, there is any change in any process in development of the new functionality, the detailed documents need to be changed by the specialized team to manually update the detailed documents describing the test flow for the new functionality. Because the specialized team has responsibility for documentation for other products and services, it can take weeks to update the detailed documents describing the test flow. After the updated documentation is made available to the test engineers, the test engineers need to make adaptions to the test automate (or more than one test automate depending on what was updated). This could again take weeks. Moreover, this delay can cause a mismatch between detailed documents describing the test flow and test automates, leading to customer and end user confusion, since any updated documentation and test automates are delivered to the customer.

There are also a number of other inconsistencies and inefficiencies in conventional documentation processes. For example, since all documents are created manually, there is a high chance for issues, such as missing data, out of date instructions, and misspelled or misleading terms. Moreover, the detailed documents describing the test flow, for example, must be repeatedly manually updated when a scenario document changes or the application functionality or interfaces change. These changes must be incorporated into test automates as well. Furthermore, documentation and automates are typically maintained separately, leading to redundancies. And, as can be understood from the above example, conventional documentation processes involve a convoluted process with many steps and multiple teams. This change management structure often leads to out-of-date content being delivered to customers. Also, every writer who prepares documentation, such as the detailed test documents describing the testing flow for new functionality, has his or her own communication style, leading to inconsistent language and terminology across documents.

Example embodiments described herein provide for a new process for generating needed documentation for a new product or new functionality. Instead of a documentation process like the example process described above, a user can simply record his or her use of the new functionality to generate a test automate. The test automate is then used to generate the documentation. In an example embodiment, a computing system receives a request for documentation related to functionality of an application, accesses a test automate generated from a recording of actions using the functionality of the application, parses the test automate to determine one or more steps in a process and, for each step in the process, determines a list of the actions for the step and corresponding data. The computing system generates a file in a predefined standardized format, the file comprising the one or more steps and the list of actions and corresponding data for each step. The computing system further determines a selected template for generating documentation for the functionality of the application, generates a populated template by populating one or more steps and corresponding list of actions in the selected template using the file comprising the one or more steps and the list of actions and corresponding data for each step, and provides the populated template to a computing device to be displayed on the computing device.

Example embodiments provide for a number of benefits. For example, business processes can be documented automatically from a test automate, which eliminates the need for double maintenance wherein for every change both documentation and automates need to be adapted accordingly. Moreover, this cuts down the number of steps and redundant documentation produced in conventional documentation processes and maintains standardization across all generated documents so that customers and users internal to the organization have a better user experience and ease of understanding. Further, example embodiments allow for effective handling of version control as documents are generated directly from current automates which are up to date.

Example embodiments also reduce test case description issues which constitute a major part of incidents in conventional systems. Moreover, example embodiments can seamlessly handle multiple scenario and data variants and translate the content into all supported languages automatically.

In testing of example embodiments, the inventors found that there was a 40% reduction in errors overall, reducing support costs, and a significant reduction in resources needed for documentation processes. Moreover, significant time savings were achieved by reducing the number of deployment phases.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other computing or communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user 106 that is used to access and utilize cloud services, among other applications.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., third-party servers 130, server system 102) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, a sales order creation application, and the like.

In some embodiments, one or more client applications 114 may be included in a given client device 110, and configured to locally provide the user interface and at least some of the functionalities, with the client application(s) 114 configured to communicate with other entities in the system 100 (e.g., third-party servers 130, server system 102, etc.), on an as-needed basis, for data and/or processing capabilities not locally available (e.g., access location information, access software version information, access an ERP system, access a CRM system, access an analytics design system, access data to respond to a search query, to authenticate a user 106, to verify a method of payment, access test data, and so forth). Conversely, one or more applications 114 may not be included in the client device 110, and then the client device 110 may use its web browser to access the one or more applications hosted on other entities in the system 100 (e.g., third-party servers 130, server system 102).

A server system 102 may provide server-side functionality via the network 104 (e.g., the Internet or wide area network (WAN)) to one or more third-party servers 130 and/or one or more client devices 110. The server system 102 may include an application program interface (API) server 120, a web server 122, and a documentation generation system 124 that may be communicatively coupled with one or more databases 126.

The one or more databases 126 may be storage devices that store data related to users of the system 100, applications associated with the system 100, cloud services, and so forth. The one or more databases 126 may further store information related to third-party servers 130, third-party applications 132, client devices 110, client applications 114, users 106, and so forth. In one example, the one or more databases 126 may be cloud-based storage.

The server system 102 may be a cloud computing environment, according to some example embodiments. The server system 102, and any servers associated with the server system 102, may be associated with a cloud-based application, in one example embodiment.

The documentation generation system 124 may provide back-end support for third-party applications 132 and client applications 114, which may include cloud-based applications. The documentation generation system 124 generates documentation based on test automates, as described in further detail below. The documentation generation system 124 may comprise one or more servers or other computing devices or systems.

The system 100 further includes one or more third-party servers 130. The one or more third-party servers 130 may include one or more third-party application(s) 132. The one or more third-party application(s) 132, executing on third-party server(s) 130, may interact with the server system 102 via API server 120 via a programmatic interface provided by the API server 120. For example, one or more the third-party applications 132 may request and utilize information from the server system 102 via the API server 120 to support one or more features or functions on a website hosted by the third party or an application hosted by the third party. The third-party website or application 132, for example, may provide access to templates for document generation and corresponding functionality that is supported by relevant functionality and data in the server system 102.

Figure 2:
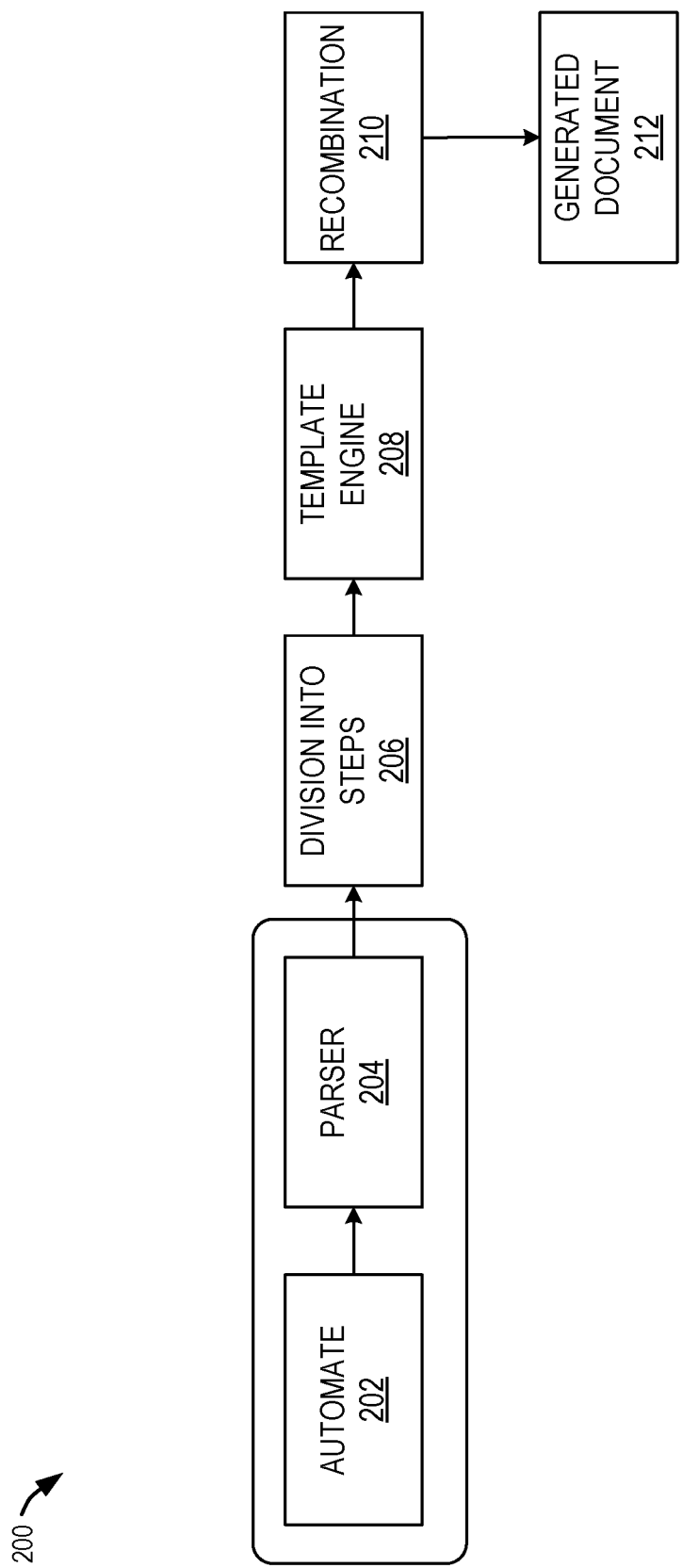
FIG. 2 is a block diagram illustrating components of a document generation system, according to some example embodiments.

FIG. 2 is a flow chart 200 illustrating a high-level overview of a process performed by the documentation generation system 124. The process shown in FIG. 2 and further described below, can create standardized test documentation from automates created with any automation tool. For example, after automating a test process, the output (e.g., a test automate 202) can be supplied as input to the process. For example, a test automate 202 can be input into a parser 204. For each possible input automation tool, a corresponding parser 204 is created that is designed to extract data, such as steps, actions, labels, values, among other details, from the test automate 202. The results of the parser 204 are returned as a list of action, value and label triplets, as described in further detail below.

The documentation generation system 124 then splits the output of the parser 204 into distinct procedures and stores these in a standardized file format, such as a JSON based format. In this way the documentation generation system 124 can work for any automation tool that can be converted into this standardized form.

Next, the standardized output is divided into different steps (e.g., in operation 206) based on action-label logic and then every step is passed to the template engine 208 where templates for all the actions are used to generate explanations for every step. Here the tool can also be modular, allowing for multiple layout and step templates to be used to create different types of outputs.

Next, every step generated by the template engine 208 is combined with others (e.g., in operation 210), optionally taking into account any relevant General Data Protection Regulation (GDPR) and other Data Privacy and Protection (DPP) regulations. For example, a check can be inserted to validate the values exported. The documentation generation system 124 further can ensure that sensitive and strategic business content is not maintained in the document while recombining. At this stage, headers, pre-requisites, purpose, and other fields can also be added which can be filled in automatically or manually based on the use case. At this stage any user input can also be added. Finally, the generated documentation is output in operation 212.

Figure 3:
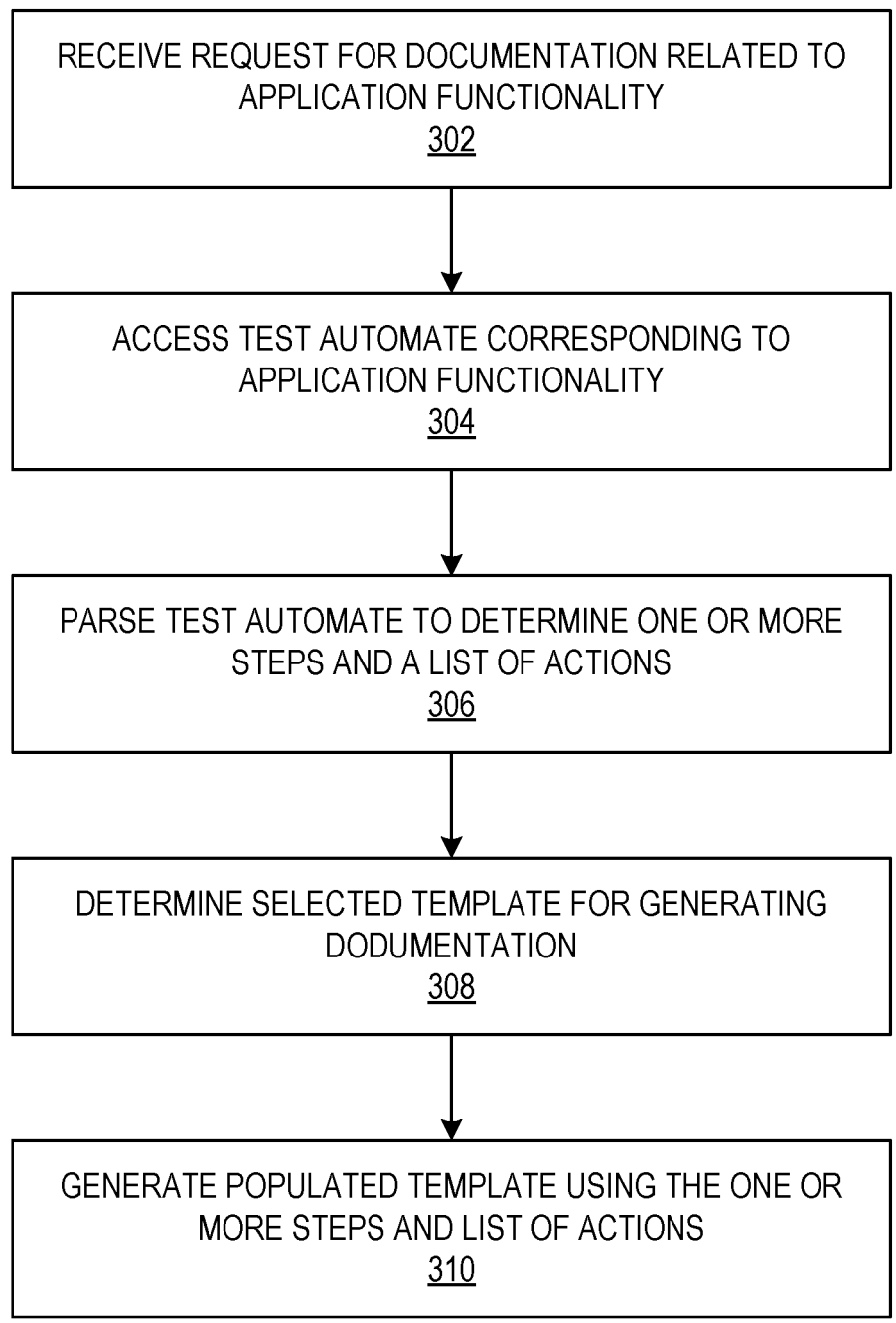
FIG. 3 is a flow chart illustrating aspects of a method for generating documentation from a test automate, according to some example embodiments.

FIG. 3 is a flow chart illustrating aspects of a method 300 for generating documentation from a test automate, according to some example embodiments. For illustrative purposes, method 300 is described with respect to the networked system 100 of FIG. 1. It is to be understood that method 300 may be practiced with other system configurations in other embodiments.

In operation 302, a computing system (e.g., server system 102 or documentation generation system 124) receives, from a computing device (e.g., client device 110 or via third-party server 130), a request for documentation related to functionality of an application. For example, a user may send a request for documentation related to functionality captured in one or more test automates. The functionality may relate to a single application or more than one application used in a business process (e.g., for creating a sales order or other business process).

For example, a user (e.g., a test engineer) records his or her use of the new functionality to generate a test automate. As explained above, actions for an application are recorded into a document (e.g., XML or another format). For example, actions that would be performed by a user to complete a sales order in a sales order application are recorded and stored in a document (e.g., the actions of the test engineer when using the new functionality in the software application are recorded in an XML document created using a recorder tool).

Figure 4:
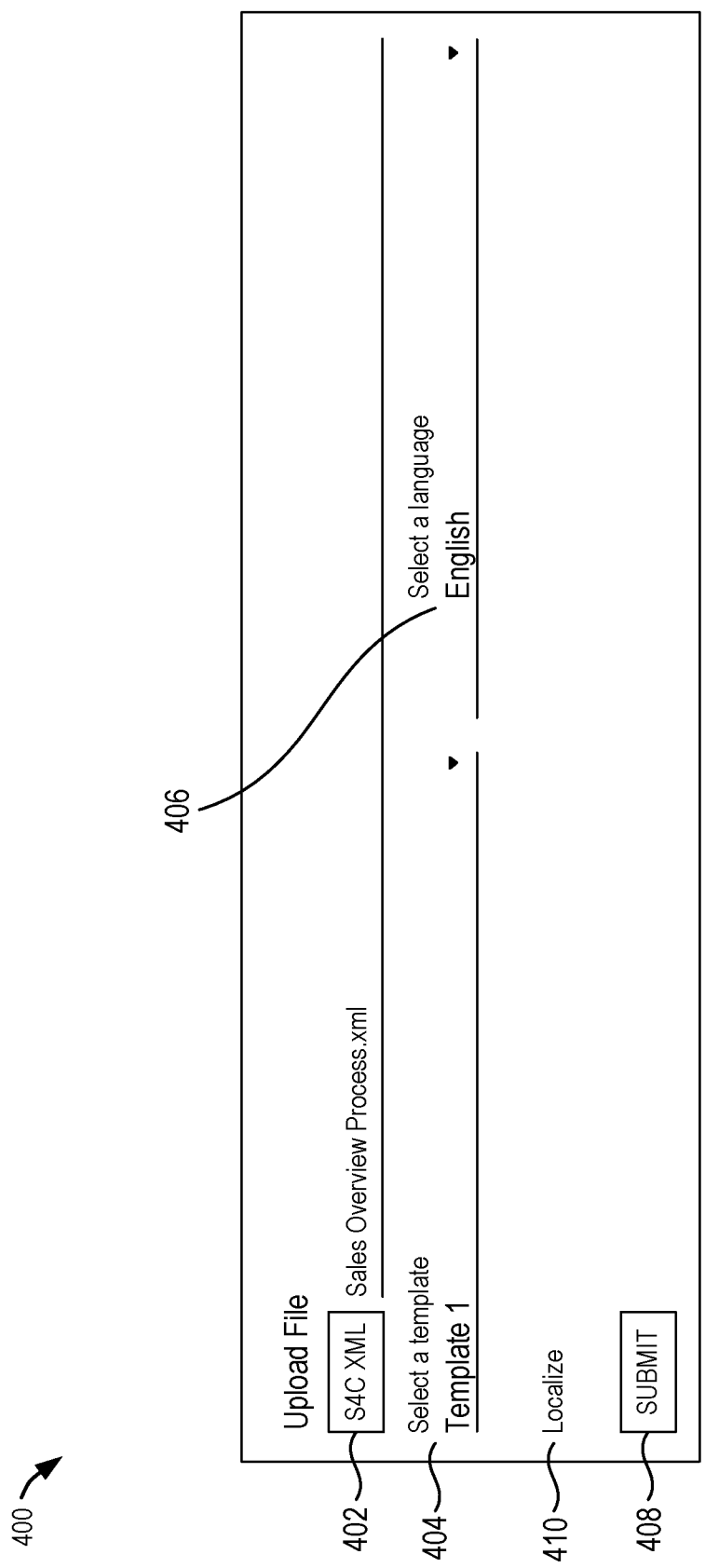
FIG. 4 illustrates an example user interface, according to some example embodiments.

The user can send a request, via a computing device, to generate documentation based on the test automate. In one example, the computing system can cause a graphical user interface (GUI) 400 to be displayed on the user's computing device that allows the user to specify an automate file (e.g., an XML file) 402, a template to be used to generate the documentation 404, and any localization 410, as shown in FIG. 4. The GUI 400 can also include an option 408 to submit the request.

In operation 304, the computing system accesses a test automate generated from a recording of actions using the functionality of the application (or applications). For example, the computing system may receive the test automate as part of the request from the computing device or may access one or more data stores to access or upload the test automate. FIGS. 5-7 illustrate example portions of a test automate in XML format. FIGS. 5-7 are explained in further detail below.

In operation 306, the computing system parses the test automate to determine one or more steps and a list of actions for each step. In one example embodiment, a separate parser is developed for each tool used to generate the test automate, or for each file format for a test automate. For example, the automate can be recorded into XML format, JavaScript, or another format. Each format has a different naming convention scheme for processes, steps, actions, and the like. Accordingly, each parser can appropriately parse the corresponding format. In this way, no matter what format the test automate, the computing system can parse the test automate to determine one or more steps in a process and corresponding actions and data, and generate a standard file format (e.g., JSON file format).

In one example, the computing system may determine the format of the test automate (e.g., by the naming convention of the file (e.g., .xml)), from user input, by analyzing the content of the file, by determining the tool used to generate the test automate, or by other means, and then select the corresponding parser for the determined format of the test automate.

FIGS. 5-7 each comprise a portion (500, 600, and 700 respectively) of an example test automate for a process to create a sales order. For ease of viewing, only three portions 500, 600, and 700 are shown since the entire file is very long and would not fit in a reasonable number of drawings. This example test automate is in an XML, format. Accordingly, the computing system would use a parser for an XML format test automate to parse the test automate shown in FIGS. 5-7.

The XML parser parses the test automate for predefined naming conventions for data needed to determine an application name and/or type, one or more steps in the process, a list of actions for each step and corresponding data, and so forth. For example, the parser would find the term "<APPLICATION/>" 502 in the portion 500 of FIG. 5 to determine that the application name is "SalesOrder-create" (e.g., "<TAGNAME>SalesOrder-create). The parser would further find the term "<STEP_DESC>" 504 to determine a first step 506 called "Create Sales Order." The parser then further finds each of the actions for the step 506. In this example, an action is indicated by the tag "ACTION TYPE" such as ACTION TYPE 508 and ACTION TYPE 510. The example action types 508 and 510 are fields. Another example action type is a click, as shown as 602 in the portion 600 of FIG. 6 for ACTION TYPE 604. The parser continues traversing the test automate file until all steps and corresponding actions and data are determined. For example, the parser would find the term "STEP_DESC" 702 in the portion 700 of FIG. 7 to determine a second step 704 in the process "Outbound Delivery." And likewise find a list of actions for step 704, such as ACTION TYPE 706, which is a field. In this way the parser searches through the test automate to find and pull out specified details, such as application or functionality name, steps, actions, and related data.

The output of the parser is a file that is generated in a predefined standardized format (e.g., JSON or another standardized format). The file comprises the one or more steps determined by the parser, and a list of actions and corresponding data for each step. For example, the following file can be generated from the example test automate, for which portions are shown in FIGS. 5-7:

```
{
  "Sales Order Overview": {
    "Create Sales Order": [
      [
        "",
        "SalesOrder-create",
        "AppTag",
        ""
      ],
      [
        "OR",
        "Sales Document Type",
        "ComboBoxSearch",
        ""
      ],
      [
        "1010",
        "Sales Organization",
        "ComboBoxSearch",
        ""
      ],
      [
        "",
        "Sales Organization Distribution Channel Division Sales Office Sales Group",
        "Button",
        ""
      ],
      [
        "10",
        "Distribution Channel",
        "ComboBoxSearch",
        ""
      ],
      [
        "",
```

-continued

```
        "Sales Organization Distribution Channel Division Sales Office Sales Group",
        "Button",
        ""
      ],
      [
        "",
        "Sales Organization Distribution Channel Division Sales Office Sales Group",
        "Button",
        ""
      ],
      [
        "00",
        "Division",
        "ComboBoxSearch",
        ""
      ],
      [
        "",
        "Continue",
        "Button",
        ""
      ],
      [
        "",
        "Sold-To Party Ship-To Party",
        "Button",
        ""
      ],
      [
        "10100001",
        "Ship-To Party",
        "ComboBoxSearch",
        ""
      ],
      [
        "",
        "Sold-To Party Ship-To Party",
        "Button",
        ""
      ],
      [
        "TESTING",
        "Customer Reference",
        "ComboBoxSearch",
        ""
      ],
      [
        "TG11",
        "Material",
        "InputField",
        ""
      ],
      [
        "1000",
        "Order Quantity",
        "InputField",
        ""
      ],
      [
        "",
        "Save",
        "Button",
        ""
      ],
      [
        "Sales Order",
        "Standard Order 270 has been saved.",
        "MESSAGE",
        ""
      ]
    ],
    "Outbound Delivery": [
      [
        "",
        "OutboundDelivery-createFromDueList"
        "AppTag",
        ""
```

-continued

```
        ],
        [
            "270",
            "Sales Document",
            "InputField",
            ""
        ],
        [
            "",
            "Go",
            "Button",
            ""
        ],
        [
            "X",
            "Column2",
            "CheckBox",
            ""
        ],
        [
            "",
            "Create Deliveries (1)",
            "Button",
            ""
        ],
        [
            "",
            "Display Log",
            "Button",
            ""
        ]
    ]
  }
}
```

As can be seen in the above file that was generated, a process name or functionality was determined from the test automate "Sales Order Overview," and two steps, "Create Sales Order" and "Outbound Delivery," have been determined by the parser. Further, a list of actions that were found for each step are listed under each step. In this example, each action comprises an action (e.g., action type), a label, and a value (e.g., a triplet). For example, the second action listed under the Create Sales Order step comprises a value "OR," a label "Sales Document Type," and an action "ComboBoxSearch." The value is the data that is input or selected in the ComboBoxSearch field related to a Sales Document Type. In this example, the value OR indicates a particular order type.

As another example, the fourth action under the Create Sales Order step comprises just a label, "Sales Organization Distribution Channel Division Sales Office Sales," and an action "Button." Since the action in this case is a button (e.g., to click on or select a button) there is no corresponding value.

As another example, the first action listed under the Create Sales Order step comprises an action of "AppTag" and a label "SalesOrder-create." This indicates which application is to be accessed to perform the rest of the actions. So, this first step indicates that a user needs to access (e.g., open, initiate) the application to create a sales order. Also, the computing system can determine the action name of the application from the AppTag. For instance, the computing system can use the AppTag and label SalesOrder-create to look up (e.g., via an API lookup) in an application library (or other data store) to determine the actual name of the application to be presented in the final documentation, as explained further below.

In operation 308, the computing system determines a selected template for generating documentation for the functionality of the application. In one example, a user provides input selecting a particular template, via a GUI, such as shown in 404 in the example GUI 400 of FIG. 4. In another example, the computing system can select a default template, if no template is specified by a user, or a template can be specified by other means. Each template may comprise a cover page (e.g., with a title, date, graphics, etc.), a particular format for which to display the process, steps, actions, and related data, and further information and details (e.g., summary of process, overview, roles and support, disclaimers, and forth).

In operation 310, the computing system generates a populated template using the data in the file generated in the predefined standardized format. For example, the computing system can generate a populated template by populating one or more steps and corresponding list of actions and corresponding data for each step. Using the example file above, the computing system populates a template with two steps, Create Sales Order and Outbound Delivery, and includes the list of actions for each step. The populated template is provided to a computing device (e.g., the requesting computing device or other computing device) to be displayed on the computing device.

FIG. 8 illustrates an example portion 800 of a populated template for a Sales Order Overview process. The example portion 800 comprises a Create Sales Order step 802. The Create Sales Order step 802 comprises a list of actions 804. In the example portion 800, only the first seven actions are listed. In an actual template, all of the determined actions would be listed. Each action in the list of actions 804 comprises a step number 806, an action description 808, expected results 810, and comments 812. In one example, all fields are editable by a user.

Using the example generated file above, it can be seen that the first step listed above for "Create Sales Order" is used to populate the Create Sales Order step 802, the first action listed above with "Apptag" is used to populate the first action "Navigate to the New Standard Process Step app," the second action list above for "ComboBoxSearch" is used to populate the second action "Enter Value or In Sale Document Type Field," and so forth.

FIG. 9 illustrates an example of another portion 900 of the populated template for the Sales Order Overview process. The example portion 900 comprises an Outbound Delivery step 902. The Outbound Delivery step 902 comprises a list of actions 904. Each action in the list of actions 904 comprises a step number 906, an action description 908, expected results 910, and comments 912. In one example, all fields are editable by a user.

Using the example generated file above, it can be seen that the second step listed above for "Outbound Delivery" is used to populated the Outbound delivery step 902, the first action listed above with "Apptag" is used to populate the first action "Navigate to the New Standard Process Step app," the second action listed above for "InputField" is used to populate the second action "Enter 270 in Sales Document field," and so forth. For example, each type of action may have a corresponding string that can be used to populate the actions in the template using a label and any value for each action. For example, the string for the second action may be "Enter [VALUE] in [LABEL] field."

FIG. 10 illustrates an example of another portion 1000 of the populated template for the Sales Order Overview process. The example portion 1000 comprises a summary section 1002 which has a summary of the Sales Overview Process. The example portion 1000 further comprises an overview section 1004 that comprises a list of steps 1006 that are included in the process, for example, steps 802 and

902. The example portion 1000 further comprises a roles and support section 1016 that comprises a list of apps 1008, a user or users 1010 that can access the apps 1008, and a role 1012 for each user. The example portion 1000 further comprises the test procedures 1014 which comprises the steps 802 and 902 (not shown) and respective list of actions 804 (only showing the first action) and 904 (not shown).

In one example, the computing system populates the users 1010 and roles 1012 by accessing a datastore to determine one or more users and application roles for authorized access to the application and populating the template with the one or more users and application roles.

As mentioned above, the computing system may optionally take into account any relevant GDPR and DPP regulations. For example, if documentation is to be provided for Europe or a European Union country, when generating the populated template, the computing system can review the data of the generated file to determine if an action corresponds to a data field comprising personal information of a user that falls under GDPR, such as, for example, if a value comprises an email address, a phone number, a residential address, and so forth. The computing system can replace the personal information with specified generic data to populate the template. The computing system can either replace the personal data directly in the generated file after which the generic data will be used to populate the template, or the computing system can simply populate the template with the specified generic data. In this way, the computing system can automatically ensure compliance with various regulations.

A template can further comprise regulation information, such as disclaimers and legal information specific to a country in which the documentation is to be provided. To do this, the computing system can determine in which country the documentation is to be provided by the language it is requested in, by a selection made by a user, by a predefined list of countries for a particular language, or other means. The computing system can generate the regulation information by selecting the appropriate regulation information for the country or countries where the documentation will be provided and then populating the template with the regulation information. In this way, documentation can be quickly generated that includes regulation information for any number of different countries.

In one example embodiment, one or more of the fields of the populated template are editable by a user. For example, the computing system can provide the populated template to the computing device and the computing device can cause the populated template to be displayed on a display of the computing device. The user can then select any field to make changes or edits. For example, a user can select one of the actions, for example "Click on the Continue button" and change it to "Press on the Continue button," add comments in a comments field (such as comments 812 or 912), change the summary or overview, add an additional action to a step, and so forth.

In one example, there may be one or more actions in the test automate that have not been modeled by the computing system. In this case, the computing system may populate the template and leave a blank action for the step that can then be filled in by the user.

The computing system receives the additional data or edited data from the computing device and stores the additional/edited data in the populated template. In one example embodiment, the computing system can make the same changes to the generate standardized file and/or the test automate so that any changes are reflected in all documents. In this way, a user can again request generation of documentation and have all the previous changes reflected in the new populated template. Also, if a user wants to translate and/or localize the documentation, the translated and/or localized populated template/generated documentation will reflect all changes made (e.g., in all 50-60 countries and corresponding languages).

After the user has finalized the populated template (e.g., reviewed and/or edited the populated template) the user can save the template as the final documentation. In one example embodiment, the final documentation is saved in a non-editable format (e.g., pdf). The final documentation can then be shared with a customer or other users.

In one example embodiment, a user can request that the documentation be localized for one or more countries. The computing system receives the request to localize a populated template, accesses data indicating country-specific information for one or more countries, and generates a localized version of the populated template for each of the one or more countries using country-specific information. Country-specific information can comprise a language, a tax code, a currency type, a data value to replace a data value for at least one action in the template, and the like.

For example, a user can specify another language (e.g., German in field 406) in the example GUI 400. In another example, the user can specify multiple languages to generate multiple populated templates. The computing system translates the data in the generated file into the specified language and also accesses a datastore to determine what data values may need to be changed depending on the language and corresponding country. For example, certain values may be country specific, such as the value 1010 in action three under the Create Sales Order step 802 shown in FIG. 8 may need to be changed to 1710 for Germany. In one example embodiment, the computing system accesses a matrix or other data source that has values for each country to determine which values to replace for a corresponding country. FIG. 11 illustrates an example matrix 1100 showing different values for different fields depending on the country. In one example, a user can request localization via a GUI (e.g., option 410 in GUI 400) and select a country for which to localize the data. In one example, localization also includes country-specific disclaimers and legal information. Also, in this way, if any country-specific values, regulations, disclaimers, legal information, and so forth, are changed for a particular country, the template can be automatically populated with the changed or updated information.

The computing system can then provide the populated template which will include all text, steps, actions, and so forth in the requested language (e.g., German or Italian), and all values updated for the corresponding country. As explained above, the populated template can then be edited, if desired, by a user. In one example, the template can be localized and translated for 50-60 countries.

Example embodiments can be used in a number of use cases. Some example use cases include: robotic process automation (RPA) bot workflows, creating process documentation to serve as product feature guides, allowing customers to document customer processes they create, enabling development teams to easily maintain test cases, boosting test script quality through automated generation (e.g., no test script issues), and increasing job satisfaction by eliminating repetitive work done by employees.

In addition to what is explained above, example embodiments provide numerous benefits. One example is instantaneous document generation. The documentation is generated as soon at the automates are updated, thereby reducing overall time required. Moreover, there are greatly reduced or no test script issues. Since documents are generated based on pre-fed templates, there is a low probability of any test script issues, unlike any manual document creation. Further, example embodiments provide for easy change management. As documents are directly generated, language consistency, standardized formats, and reduced ambiguity, among others, can be achieved. This improves the overall quality of the documentation.

Also, example embodiments allow for GDPR compliance enforcement. For example, sensitive and private customer data can be centrally removed from documents, ensuring compliance requirements are fulfilled. And, example embodiments provide for minimal human intervention. Human efforts for creation and maintenance of documentation are saved due to the automated documentation generation described herein.

Figure 12:
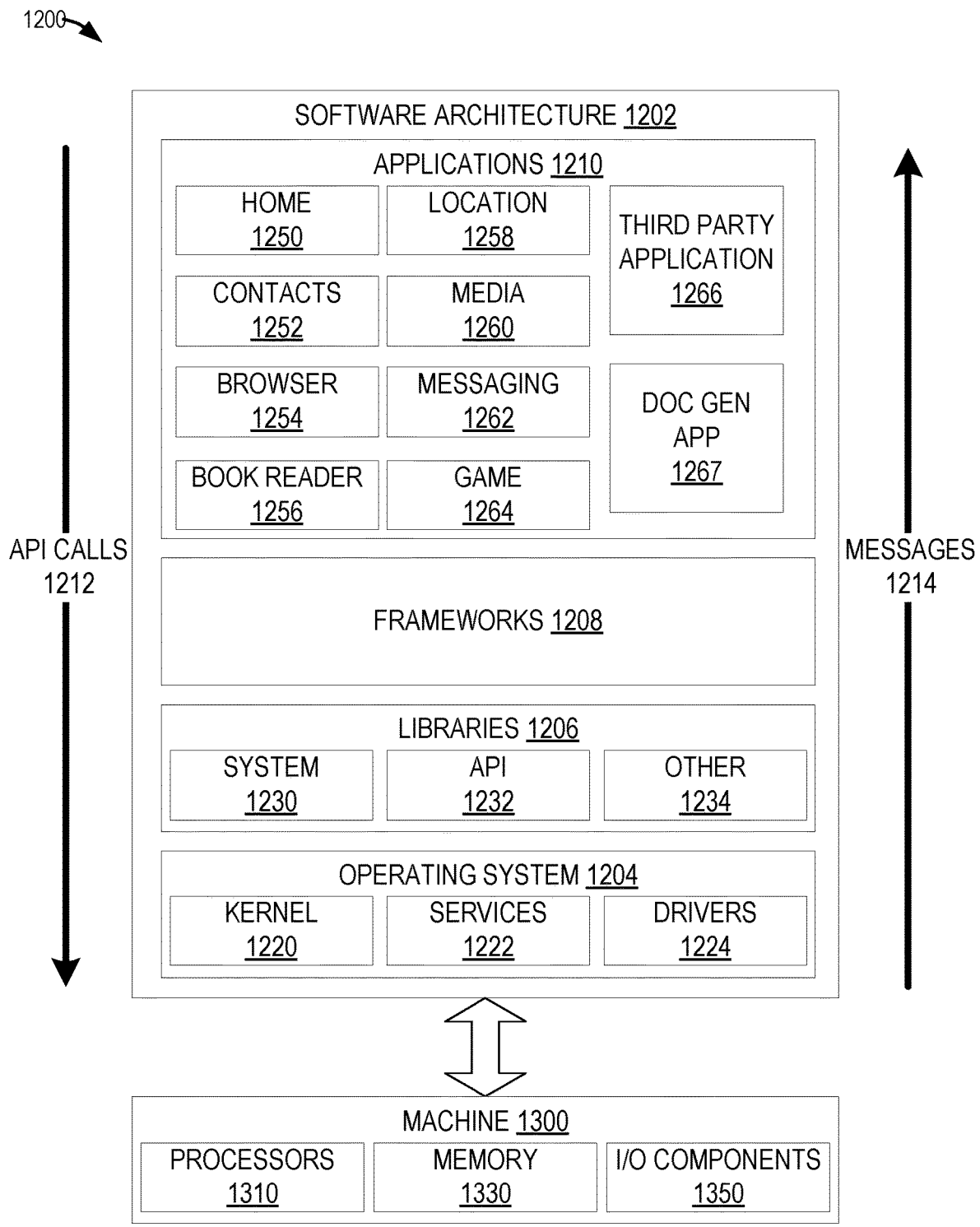
FIG. 12 is a block diagram illustrating an example of a software architecture that may be installed on a machine, according to some example embodiments.

FIG. 12 is a block diagram 1200 illustrating software architecture 1202, which can be installed on any one or more of the devices described above. For example, in various embodiments, client devices 110 and servers and systems 130, 102, 120, 122, and 124 may be implemented using some or all of the elements of software architecture 1202. FIG. 12 is merely a non-limiting example of a software architecture, and it will be appreciated that many other architectures can be implemented to facilitate the functionality described herein. In various embodiments, the software architecture 1202 is implemented by hardware such as machine 1300 of FIG. 13 that includes processors 1310, memory 1330, and I/O components 1350. In this example, the software architecture 1202 can be conceptualized as a stack of layers where each layer may provide a particular functionality. For example, the software architecture 1202 includes layers such as an operating system 1204, libraries 1206, frameworks 1208, and applications 1210. Operationally, the applications 1210 invoke application programming interface (API) calls 1212 through the software stack and receive messages 1214 in response to the API calls 1212, consistent with some embodiments.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers, consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system 1204 or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as a third-party application 1266. According to some embodiments, the applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third-party application 1266 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1266 can invoke the API calls 1212 provided by the operating system 1204 to facilitate functionality described herein.

Some embodiments may particularly include a documentation generation application 1267. In certain embodiments, this may be a stand-alone application that operates to manage communications with a server system such as third-party servers 130 or server system 102. In other embodiments, this functionality may be integrated with another application. The documentation generation application 1267 may request and display various data related to generating documentation from an automate and may provide the capability for a user 106 to input data related to the objects via a touch interface, keyboard, or using a camera device of machine 1300, communication with a server system via I/O components 1350, and receipt and storage of object data in memory 1330. Presentation of information and user inputs associated with the information may be managed by documentation generation application 1267 using different frameworks 1208, library 1206 elements, or operating system 1204 elements operating on a machine 1300.

Figure 13:
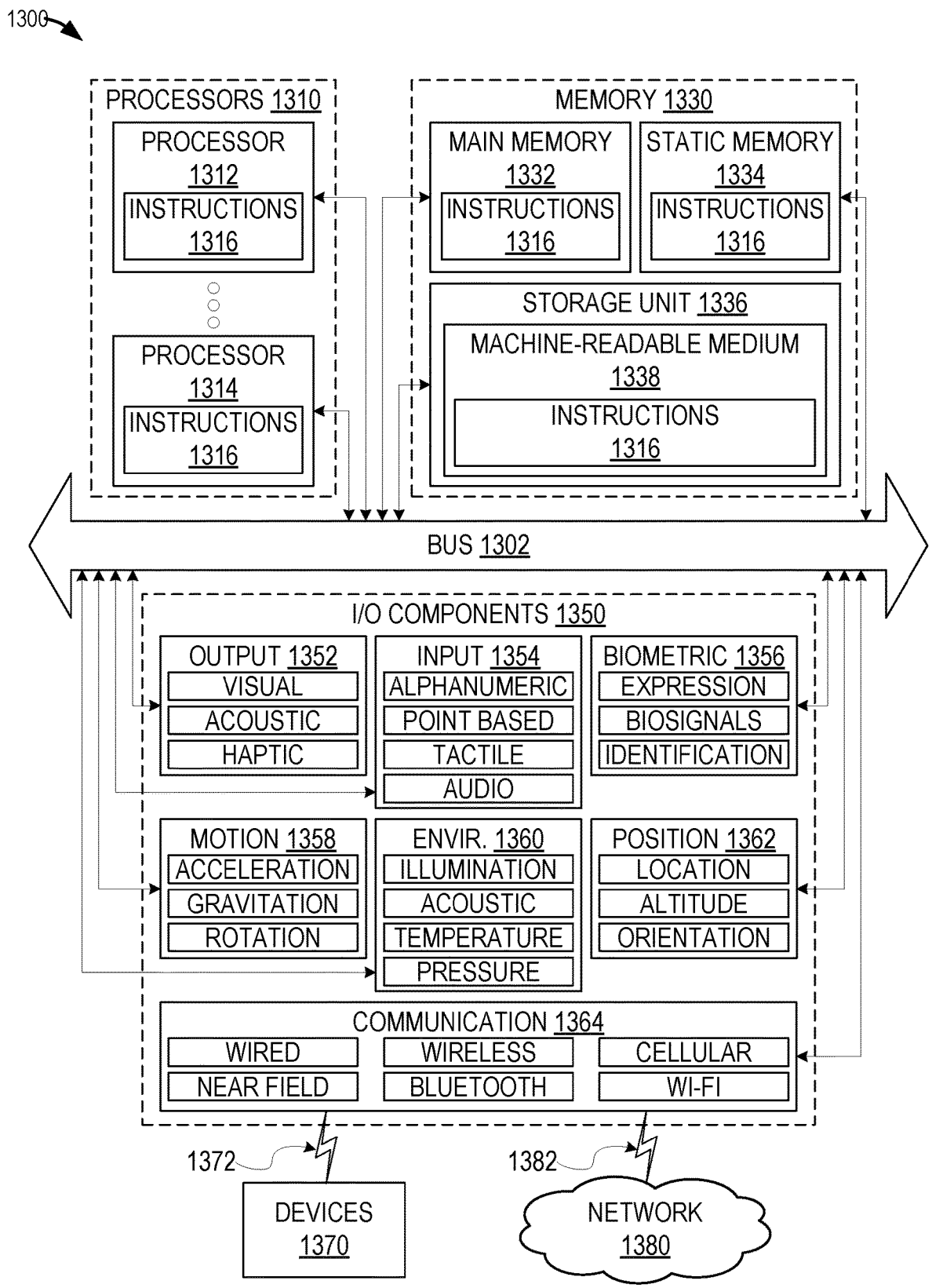
FIG. 13 illustrates a diagrammatic representation of a machine, in the form of a computer system, within which a set of instructions may be executed for causing the machine to perform any one or more of the methodologies discussed herein, according to an example embodiment.

FIG. 13 is a block diagram illustrating components of a machine 1300, according to some embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application 1210, an applet, an app, or other executable code) for causing the machine 1300 to perform any one or more of the methodologies discussed herein can be executed. In alternative embodiments, the machine 1300 operates as a standalone device or can be coupled (e.g., networked) to other machines. In a networked deployment, the machine 1300 may operate in the capacity of a server machine or system 130, 102, 120, 122, 124, etc., or a client device 110 in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

In various embodiments, the machine 1300 comprises processors 1310, memory 1330, and I/O components 1350, which can be configured to communicate with each other via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1312 and a processor 1314 that may execute the instructions 1316. The term "processor" is intended to include multi-core processors 1310 that may comprise two or more independent processors 1312, 1314 (also referred to as "cores") that can execute instructions 1316 contemporaneously. Although FIG. 13 shows multiple processors 1310, the machine 1300 may include a single processor 1310 with a single core, a single processor 1310 with multiple cores (e.g., a multi-core processor 1310), multiple processors 1312, 1314 with a single core, multiple processors 1312, 1314 with multiples cores, or any combination thereof.

The memory 1330 comprises a main memory 1332, a static memory 1334, and a storage unit 1336 accessible to the processors 1310 via the bus 1302, according to some embodiments. The storage unit 1336 can include a machine-readable medium 1338 on which are stored the instructions 1316 embodying any one or more of the methodologies or functions described herein. The instructions 1316 can also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various embodiments, the main memory 1332, the static memory 1334, and the processors 1310 are considered machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown, in an example embodiment, to be a single medium, the term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions 1316, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1350 include a wide variety of components to receive input, provide output, produce output, transmit information, exchange information, capture measurements, and so on. In general, it will be appreciated that the I/O components 1350 can include many other components that are not shown in FIG. 13. The I/O components 1350 are grouped according to functionality merely for simplifying the following discussion, and the grouping is in no way limiting. In various example embodiments, the I/O components 1350 include output components 1352 and input components 1354. The output components 1352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1350 include biometric components 1356, motion components 1358, environmental components 1360, or position components 1362, among a wide array of other components. For example, the biometric components 1356 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 include acceleration sensor components (e.g., accelerometer), gravitation sensor components (e.g., gyroscope), and so forth. The environmental components 1360 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or another suitable device to interface with the network 1380. In further examples, communication components 1364 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1370 may be another machine 1300 or any of a wide variety of peripheral devices (e.g., a peripheral device coupled via a Universal Serial Bus (USB)).

Moreover, in some embodiments, the communication components 1364 detect identifiers or include components operable to detect identifiers. For example, the communication components 1364 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1316 are transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, in other example embodiments, the instructions 1316 are transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Furthermore, the machine-readable medium 1338 is non-transitory (in other words, not having any transitory signals) in that it does not embody a propagating signal. However, labeling the machine-readable medium 1338 "non-transitory" should not be construed to mean that the medium is incapable of movement; the medium 1338 should be considered as being transportable from one physical location to another. Additionally, since the machine-readable medium 1338 is tangible, the medium 1338 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   accessing a test automate generated from a recording of actions during use of functionality of an application;
   selecting a parser, from a plurality of parsers, based on a format of the test automate;
   determining, using the selected parser to parse the test automate, one or more steps in a process and, for each step in the process, a list of actions for the step and corresponding data;
   generating, by one or more computer processors, a file in a predefined standardized format, the file comprising the one or more steps and the list of actions and corresponding data for each step;
   determining, by the one or more computer processors, a selected template for generating documentation for the functionality of the application;
   populating one or more steps and corresponding list of actions in the selected template with the one or more steps and the list of actions and corresponding data for each step determined from the test automate; and
   providing, via a network, the populated template to a computing device to be displayed on the computing device;
   receiving, from the computing device, edited data made to the populated template; and
   making changes to the test automate corresponding to the edited data made to the populated template.

2. The computer-implemented method of claim 1, further comprising:
   generating regulation information specific to a country in which documentation generated from the template will be provided; and
   populating the template with the generated regulation information.

3. The computer-implemented method of claim 1, further comprising:
   receiving input adding detail to the populated template; and
   storing the added detail in the populated template.

4. The computer-implemented method of claim 3, wherein the populated template provided to the computing device comprises at least one comments section, and wherein the received input adding detail to the populated template is added to the comments section.

5. The computer-implemented method of claim 3, wherein the input adding detail comprises an additional action added to a step of the one or more steps.

6. The computer-implemented method of claim 3, wherein the input adding detail comprises edits made to a step or an action in the populated template.

7. The computer-implemented method of claim 1, further comprising:
   determining one or more application roles for authorized access to the application; and
   populating the template with the one or more application roles.

8. The computer-implemented method of claim 1, further comprising:
   receiving a request to localize the populated template for one or more countries;
   accessing data indicating country specific information for the one or more countries; and
   generating a localized version of the populated template for each of the one or more countries using the country specific information.

9. The computer-implemented method of claim 8, wherein the country specific information comprises at least one of a language, a tax code, a currency type, and a data value to replace a data value for at least one action in the template.

10. The computer-implemented method of claim 1, wherein generating the populated template further comprises:
    determining if an action corresponds to a data field comprising personal information of a user; and
    based on determining that the action correspond to a data field comprising personal information of a user, replacing the personal information with specified generic data.

11. A system comprising:
    a memory that stores instructions; and
    one or more processors configured by the instructions to perform operations comprising:
    accessing a test automate generated from a recording of actions during use of functionality of an application;
    selecting a parser, from a plurality of parsers, based on a format of the test automate;
    determining, using the selected parser to parse the test automate, one or more steps in a process and, for each step in the process, a list of actions for the step and corresponding data;
    generating a file in a predefined standardized format, the file comprising the one or more steps and the list of actions and corresponding data for each step;
    determining a selected template for generating documentation for the functionality of the application;
    populating one or more steps and corresponding list of actions in the selected template with the one or more steps and the list of actions and corresponding data for each step determined from the test automate; and providing the populated template to a computing device to be displayed on the computing device;

receiving, from the computing device, edited data made to the populated template; and making changes to the test automate corresponding to the edited data made to the populated template.

12. The system of claim 11, the operations further comprising:

receiving input adding detail to the populated template; and storing the added detail in the populated template.

13. The system of claim 12, wherein the populated template provided to the computing device comprises at least one comments section, and wherein the received input adding detail to the populated template is added to the comments section.

14. The system of claim 12, wherein the input adding detail comprises an additional action added to a step of the one or more steps.

15. The system of claim 12, wherein the input adding detail comprises edits made to a step or an action in the populated template.

16. The system of claim 11, the operations further comprising:

determining one or more application roles for authorized access to the application; and populating the template with the one or more application roles.

17. The system of claim 11, the operations further comprising:

receiving a request to localize the populated template for one or more countries;

accessing data indicating country specific information for the one or more countries; and generating a localized version of the populated template for each of the one or more countries using the country specific information.

18. The system of claim 17, wherein the country specific information comprises at least one of a language, a tax code, a currency type, and a data value to replace a data value for at least one action in the template.

19. The system of claim 11, wherein generating the populated template further comprises:

determining if an action corresponds to a data field comprising personal information of a user; and based on determining that the action correspond to a data field comprising personal information of a user, replacing the personal information with specified generic data.

20. A non-transitory computer-readable medium comprising instructions stored thereon that are executable by at least one processor to cause a computing device to perform operations comprising:

accessing a test automate generated from a recording of actions during use of functionality of an application;

selecting a parser, from a plurality of parsers, based on a format of the test automate;

determining, using the selected parser to parse the test automate, one or more steps in a process and, for each step in the process, a list of actions for the step and corresponding data;

generating a file in a predefined standardized format, the file comprising the one or more steps and the list of actions and corresponding data for each step;

determining a selected template for generating documentation for the functionality of the application;

populating one or more steps and corresponding list of actions in the selected template with the one or more steps and the list of actions and corresponding data for each step determined from the test automate; and providing the populated template to a computing device to be displayed on the computing device;

receiving, from the computing device, edited data made to the populated template; and making changes to the test automate corresponding to the edited data made to the populated template.

* * * * *